United States Patent [19]
Goodman

[11] Patent Number: 6,075,912
[45] Date of Patent: Jun. 13, 2000

[54] APPARATUS FOR COUPLING RADIATION BEAMS INTO AN OPTICAL WAVEGUIDE

[75] Inventor: Douglas S. Goodman, Sudbury, Mass.

[73] Assignee: Polaroid Corporation, Cambridge, Mass.

[21] Appl. No.: 09/042,885

[22] Filed: Mar. 17, 1998

[51] Int. Cl.[7] .................................................. G02B 6/32
[52] U.S. Cl. ............................. 385/33; 359/618; 385/31
[58] Field of Search ................................. 385/15, 24, 31, 385/33–35, 47, 49; 359/618, 629, 639

[56] References Cited

U.S. PATENT DOCUMENTS

| | | | |
|---|---|---|---|
| 3,827,059 | 7/1974 | Rambauske | 350/294 |
| 4,621,890 | 11/1986 | Suzuki et al. | 350/6.1 |
| 4,652,080 | 3/1987 | Carter et al. | 350/96.19 |
| 4,828,357 | 5/1989 | Arata et al. | 350/174 |
| 5,048,911 | 9/1991 | Sang et al. | 385/33 |
| 5,077,750 | 12/1991 | Pocholle et al. | 372/68 |
| 5,081,637 | 1/1992 | Fan et al. | 372/72 |
| 5,099,358 | 3/1992 | Okazaki | 359/503 |
| 5,148,326 | 9/1992 | Hohberg | 359/853 |
| 5,161,064 | 11/1992 | Clark et al. | 359/663 |
| 5,185,758 | 2/1993 | Fan et al. | 372/72 |
| 5,210,643 | 5/1993 | Fujii et al. | 359/638 |
| 5,333,077 | 7/1994 | Legar et al. | 359/619 |
| 5,355,249 | 10/1994 | Souda et al. | 359/341 |
| 5,408,553 | 4/1995 | English, Jr. et al. | 385/36 |
| 5,418,880 | 5/1995 | Lewis et al. | 385/123 |
| 5,559,911 | 9/1996 | Forkner et al. | 385/33 |

FOREIGN PATENT DOCUMENTS

WO 96/21877  6/1996  Germany .................. G02B 27/09

OTHER PUBLICATIONS

Geometrical and Instrumental Optics, vol. 25, ed. D. Malacara, 1988, § 4.4 Afocal Systems, pp. 132–142. [No Month].

*Primary Examiner*—John D. Lee
*Attorney, Agent, or Firm*—Barry Gaiman

[57] ABSTRACT

An optical apparatus is disclosed suitable for coupling discrete sources of radiation beams onto the input end of an optical fiber or a fiber laser, the optical apparatus comprising a unitary beam deflector having a plurality of deflecting facets where each deflecting facet is oriented so as to deflect an incident beam of radiation into the fiber, an input afocal relay optical system to image a beam of radiation onto a corresponding deflecting facet, and an output afocal relay optical system to image the facet beam images onto the optical fiber or laser fiber end.

42 Claims, 8 Drawing Sheets

APPARATUS FOR COUPLING RADIATION BEAMS INTO AN OPTICAL WAVEGUIDE

CROSS REFERENCE TO RELATED APPLICATION

This application is related to the commonly-assigned application Ser. No. 08/885,637 now U.S. Pat. No. 5,933,278 issued Aug. 3, 1999.

BACKGROUND OF THE INVENTION

1. Field of the Invention

This invention in general relates to an apparatus for coupling multiple sources of radiation into a waveguide device, such as an optical fiber or fiber laser, and, in particular, to a system using a unitary deflecting component to provide coupling, particularly with discrete sources of laser radiation.

2. Description of the Prior Art

There continues to be a need for ever-increasing levels of radiative power in applications such as printing, fabrication, and medical treatment. A commonly-used approach is to optically couple the emission beams from multiple radiative sources into an optical fiber or a fiber laser such that output radiation having a higher power level is emitted from the waveguide. The relevant art disclosed various configurations of such optical coupling systems. U.S. Pat. No. 5,418,880 issued to Lewis et al., for example, discloses a high-power fiber device powered by a linear array of laser diodes. The optical coupling system comprises an optical beam rotator for transforming the output of the laser diode array and transmitting the transformed output to collimating optics from which the radiation is coupling into the waveguide. In another approach, U.S. Pat. No. 5,333,077 issued to Legar et al. discloses a lens system comprising a first optical element for receiving and redirecting a laser beam from a linear diode array, for example, and a second optical element for further redirecting the laser beam to a focal point.

When greater levels of emitted power are required, discrete sources of radiation, such as laser diode devices, may be used. However, because of larger physical sizes and greater cooling requirements of these discrete devices, they cannot be emplaced in close proximity to one another and, consequently, cannot be adapted to be used in conjunction with the coupling devices designed for linear diode arrays. Rather, a plurality of separate mirrors is typically used to redirect the multiple radiation beams from discrete devices into the optical waveguide. For example, U.S. Pat. No. 4,828,357 issued to Arata et al. discloses an apparatus producing a high-power laser beam comprising a plurality of directing mirrors, a plurality of reflecting mirrors, and a central focusing mirror for focusing the resultant laser beam into one focal point. Another approach is disclosed in U.S. Pat. No. 5,210,643 issued to Fujii et al. in which an improved efficiency of combining laser beams is achieved through the use of suitably positioned dichroic mirrors and a beam splitter.

Unfortunately, the use of an arrangement of separate mirrors results in a system sensitive to misalignment and inadvertent movement, which results in complexity of alignment. Moreover, the use of multiple, separate mirrors makes it difficult to maintain the relative alignment of linearly-polarized beams at the waveguide input facet without the use of additional optical elements.

While the prior art describes a variety of optical coupling devices, there does not appear to have been disclosed in the relevant art a unitary device for coupling multiple sources of radiation into a waveguide, and it is a primary object of this invention to provide such a device.

It is another object of the present invention to provide such a device which can be used with discrete sources of laser radiation.

It is a further object of the present invention to provide such a device with which beams can be combined while maintaining relative alignment of the beam directions of polarization.

Other objects of the invention will be obvious, in part, and, in part, will become apparent when reading the detailed description to follow.

SUMMARY OF THE INVENTION

The present invention discloses an apparatus suitable for coupling the emissions from discrete sources of radiation into a waveguide such as an optical fiber or a fiber laser. The apparatus comprises a unitary beam deflector with a deflecting facet corresponding to each radiation source, an input afocal relay system for each irradiated facet, and an output afocal relay system disposed between the irradiated facets and the fiber. The apparatus and discrete radiation sources combine to form a system producing relatively high power levels of radiation. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

Figure 1:
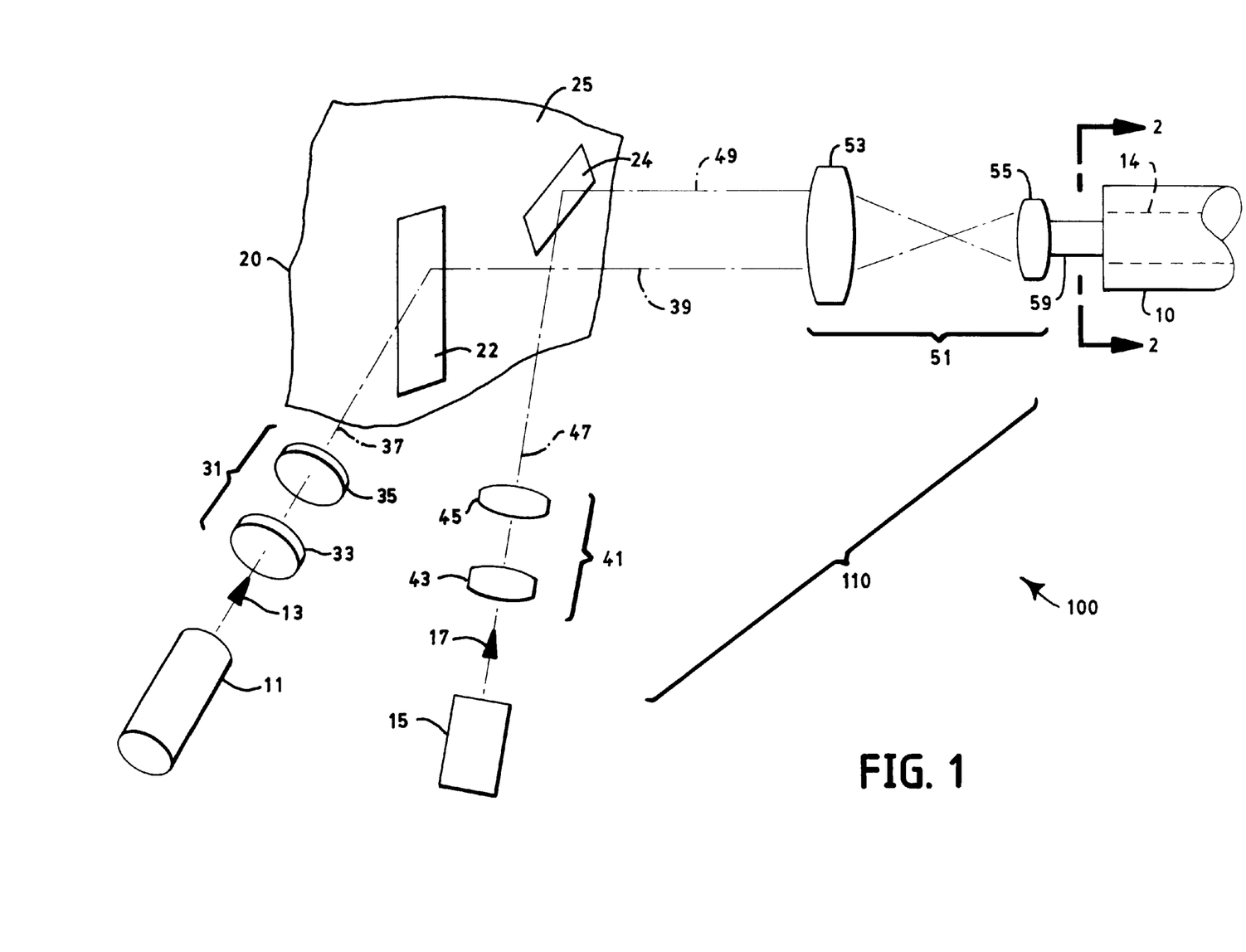
FIG. 1 is a diagrammatic perspective view of an embodiment of an apparatus for coupling radiation beams, in accordance with the present invention, illustrating the coupling of the emissions from two discrete laser devices into an optical fiber.

There is shown in FIG. 1 a system 100, in accordance with the present invention, which provides for the coupling of optical radiation, such as laser radiation beams 13 and 17 emitted by discrete laser devices 11 and 15, into a fiber laser or, as shown here, an optical fiber 10. Laser devices 11 and 15 emit output radiation of wavelengths $\lambda_1$ and $\lambda_2$, respectively, where the wavelengths need not be the same. The coupling of laser radiation beams 13 and 17 into optical fiber 10 is accomplished by means of an optical apparatus 110. Only two discrete laser devices are shown in the diagram, for purpose of clarity in illustration, and it should be understood that the present invention not is so limited and can be readily practiced with additional laser devices having one or more emission wavelengths, or with non-coherent radiation sources such as light-emitting diodes (LED) or an incandescent devices such as tungsten filament or arc lamps. Optical apparatus 110 comprises a unitary beam deflector 20, a first input optical system 31, a second input optical system 41, and an output optical system 51.

Unitary beam deflector 20 comprises two deflecting facets 22 and 24, where deflecting facet 22 is positioned in an optical path 37 of radiation beam 13 and oriented so as to deflect radiation beam 13 into optical fiber 10 along an optical path 39. Similarly, deflecting facet 24 is positioned in an optical path 47 of radiation beam 17 and is oriented so as to deflect radiation beam 17 into optical fiber 10 along an optical path 49. As can be appreciated by one skilled in the relevant art, deflecting facets 22 and 24 are preferably optically-smooth and reflective surfaces, as distinguished from a non-faceted surface region 25 of unitary beam deflector 20. It should also be noted that the distance along optical path 37 between laser device 11 and deflecting facet 22 need not be the same length as the distance along optical path 47 between laser device 15 and deflecting facet 24.

Deflecting facets 22 and 24 are substantially planar and may be formed in unitary beam deflector 20 by known methods, such as by diamond machining. It can be appreciated by one skilled in the relevant art that, while a particular method of machining may produce essentially planar deflecting facets having a slight cylindrical curvature, such facets can be also be used in practicing the present invention. In an alternative method of manufacture, unitary beam deflector can be fabricated as more than one component and formed into a unitary part by appropriate means. In a preferred embodiment, deflecting facets 22 and 24 are subsequently plated or optically coated so as to increase reflectivity at the wavelengths of the emissions of lasers 11 and 15. It should also be noted that, as it is not a requirement that radiation beams 13 and 17 lie in a common plane with optical fiber 10, the axes normal to the surfaces of deflecting facets 22 and 24 need not be coplanar.

First input optical system 31 preferably comprises an afocal relay system, an optical configuration well-known in the relevant art (see, for example, "Afocal systems," *Geometrical and Instrumental Optics,* vol. 25, Academic Press, Inc., 1988, pp. 132–42). In the example provided, first input optical system is shown comprising a first lens 33 and a second lens 35 placed in optical path 37 of radiation beam 13. Lenses 33 and 35 are positive power elements having principal planes spaced apart by a distance ($f_{33}+f_{35}$), where $f_{33}$ is the focal length of first lens 33 and $f_{35}$ is the focal length of second lens 35. First lens 33 and second lens 35, either or both of which may comprise an anamorphic element, form an afocal relay system and serve to image the smallest portion of radiation beam 13 onto deflecting facet 22. As is understood by one skilled in the relevant art, for a radiation source such as a laser diode, the smallest portion of the radiation beam is at the diode output facet. For a laser diode, therefore, afocal relay optical system 31 images the diode output facet onto deflecting facet 22. Alternatively, for a single-mode radiation source, the smallest portion of the radiation beam (i.e., the waist) would be imaged onto deflecting facet 22. Similarly, a first lens 43 and a second lens 45, placed in optical path 47, serve to image the smallest portion of radiation beam 17 onto deflecting facet 24.

Output optical system 51 preferably comprises an afocal relay system and, for purpose of illustration, is here shown comprising a first lens 53 and a second lens 55 placed in optical paths 39 and 49 of deflected radiation beams 13 and 17. First lens 53 and second lens 55 serve to image deflected radiation beams 13 and 17 as a focused group of beam images 59 into a core 14 at input facet 19 of optical fiber 10. It can be appreciated that, for best coupling efficiency, deflecting facets 22 and 24 are shaped and sized to intercept essentially all radiation imaged by input afocal relay optical systems 31 and 41 such that this radiation is redirected along essentially parallel optical paths 39 and 49, respectively, into optical fiber 10.

In alternative embodiments, one or more afocal relay systems may be replaced with one or more optical systems which meet the criteria of: i) grouping the incident radiation beams within a desirable target area, and ii) insuring that the maximum extreme angle of any radiation beam falls within the acceptance angle, or numerical aperture, of the waveguide. Use of the preferable afocal relay system, however, serves to insure that there is no excess angle growth in the radiation beam.

Figure 2:
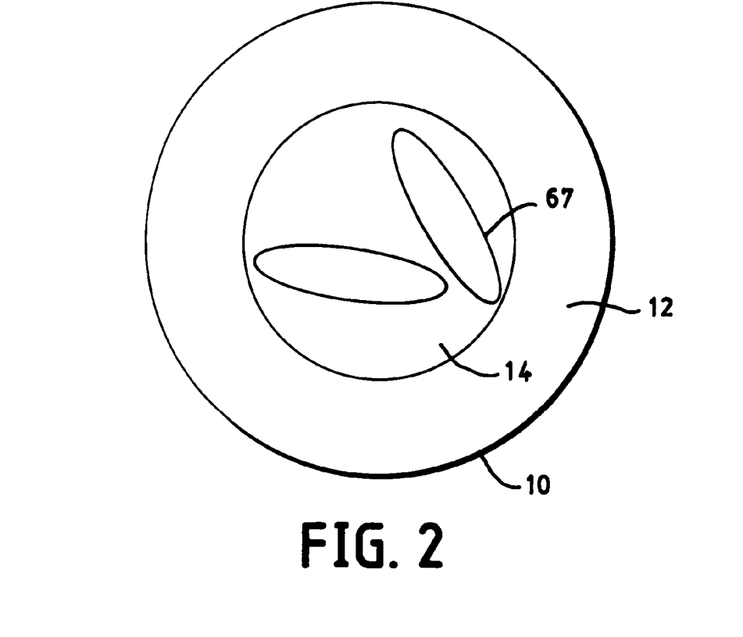
FIG. 2 is a diagram corresponding to the input end of the optical fiber of FIG. 1 illustrating the imaging of the laser emissions into the core of the optical fiber.

As best seen in FIG. 2, optical fiber 10 comprises a core 14 surrounded by a cladding layer 12. Laser beam 13 is imaged into optical fiber 10 as focused beam image 61 and laser beam 17 is imaged as focused beam image 67. For best coupling efficiency, deflecting facets 22 and 24 are sized, positioned, and oriented such that focused beam images 61 and 67 fall within core 14 as shown. Note that the transverse axes of the imaged beams need not be aligned with each other, and that the beam sizes need not be identical.

Figure 3:
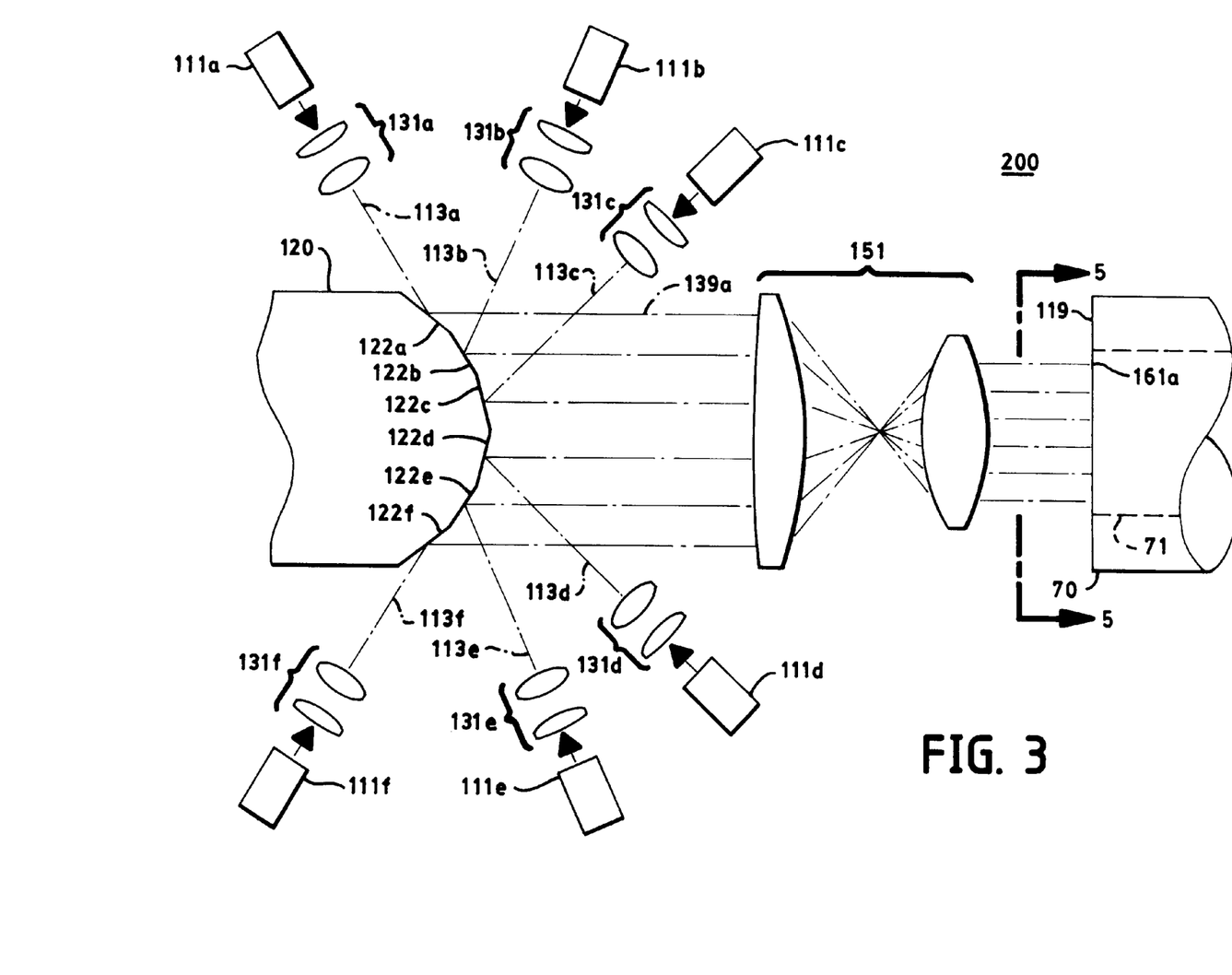
FIG. 3 is a diagrammatical plan view of an alternative embodiment of a coupling apparatus comprising a unitary beam deflector in accordance with the present invention illustrating the optical coupling of six sources of coherent radiation into a fiber laser.
Figure 4:
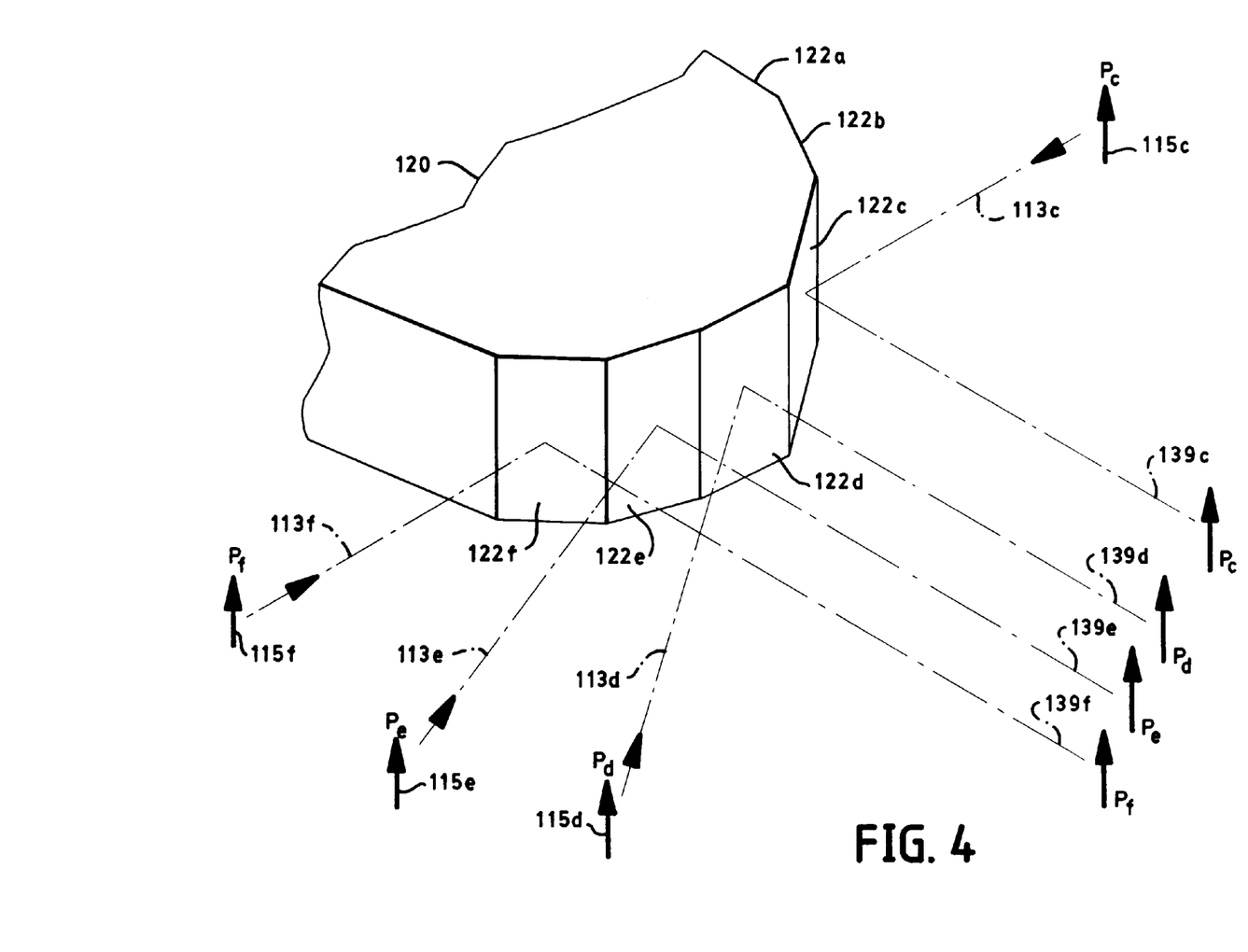
FIG. 4 is a diagrammatical perspective view of the unitary beam deflector of FIG. 3.

In an alternative embodiment, shown in FIGS. 3 and 4, an optical apparatus 200 is used to couple the radiation outputs of six discrete laser devices 111a through 111f, having output emissions 113a through 113f respectively, into an optical fiber or, as shown here, into inner cladding 71 of a fiber laser 70. Optical apparatus 200 comprises a unitary beam deflector 120, input afocal relay systems 131a through 131f, and output afocal relay system 151. Unitary beam deflector 120 comprises six rectangular deflecting facets 122a through 122f, where adjoining facets form a dihedral angle (e.g., facets 122f and 122e). In the example provided, the output radiation of discrete laser devices 111a through 111f propagate in the plane of FIG. 3. Accordingly, each of deflecting facets 122a through 122f is orthogonal to this plane, as best seen in FIG. 4. Note that, for clarity of illustration, only radiation beams 113c through 113f are shown and it should be understood that all six beams are utilized in this particular configuration. The dimensions of each deflecting facet 122a through 122f are selected so as to reflect most or all of the incident radiation. In the example shown, the height of each deflecting facet is sized to intercept and redirect the projection of the lateral component of the incident laser radiation, and the width of each deflecting facet is sized to intercept and redirect the projection of the transverse component of the incident laser radiation.

Figure 5:
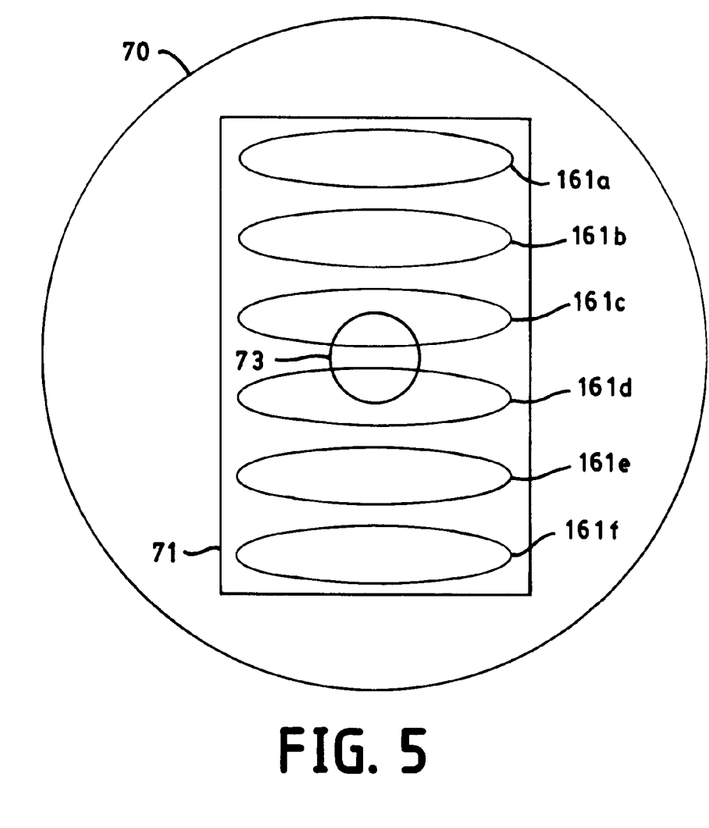
FIG. 5 is a diagram corresponding to the input end view of the fiber laser of FIG. 3 showing the emissions of the laser sources of FIG. 3 imaged into the inner cladding of the fiber laser.

Output emission 113a of laser device 111a is imaged onto deflecting facet 122a by input afocal relay system 131a. Deflecting facet 122a is oriented so as to reflect this imaged output into fiber laser 70 along optical path 139a. Output afocal relay system 151 is positioned in optical path 139 so as to image the deflected radiation onto input end 119 as a focused beam image 161a. Each of deflecting facets 122b through 122f is likewise oriented to reflect output emissions 113b through 113f from laser devices 111b through 111f respectively into fiber laser 70, as focused beam images 161b through 161f respectively, as shown in FIG. 5. Preferably, focused beam images 161a through 161f are projected into inner cladding 71. Inner cladding 71 is here shown having a rectangular cross-sectional shape, but may comprise one of a number of convex polygons (e.g., square, hexagon, rhombus, triangle) such as disclosed in commonly-assigned U.S. Pat. No. 5,533,163 issued to Muendel and incorporated herein in its entirety by reference.

As best seen in FIG. 4, unitary beam reflector 120 maintains the relative alignment of linearly-polarized beams. Beam polarization vectors components $P_C$ though $P_F$, denoted as 115c through 115f respectively, are parallel to one another prior to reflection from unitary beam reflector 120 and maintain this relative alignment after reflection. As can be appreciated by one skilled in the relative art, this alignment can be maintained because each of deflecting facets 122a through 122f is orthogonal to the plane of FIG. 3.

In a preferred embodiment, laser devices 111a through 111f comprise laser diodes disposed approximately 80 mm from respective deflecting facets. Deflecting facets 122a through 122f are approximately 3.0 mm by 0.3 mm wide. Afocal relay system 151 images deflected output emissions 113a through 113f onto an optical laser facet as focused image beams approximately 3.0 mm by 0.05 mm. The focused image beams are projected into a fiber laser comprising a square inner cladding approximately 0.2 mm by 0.2 mm.

Figure 6:
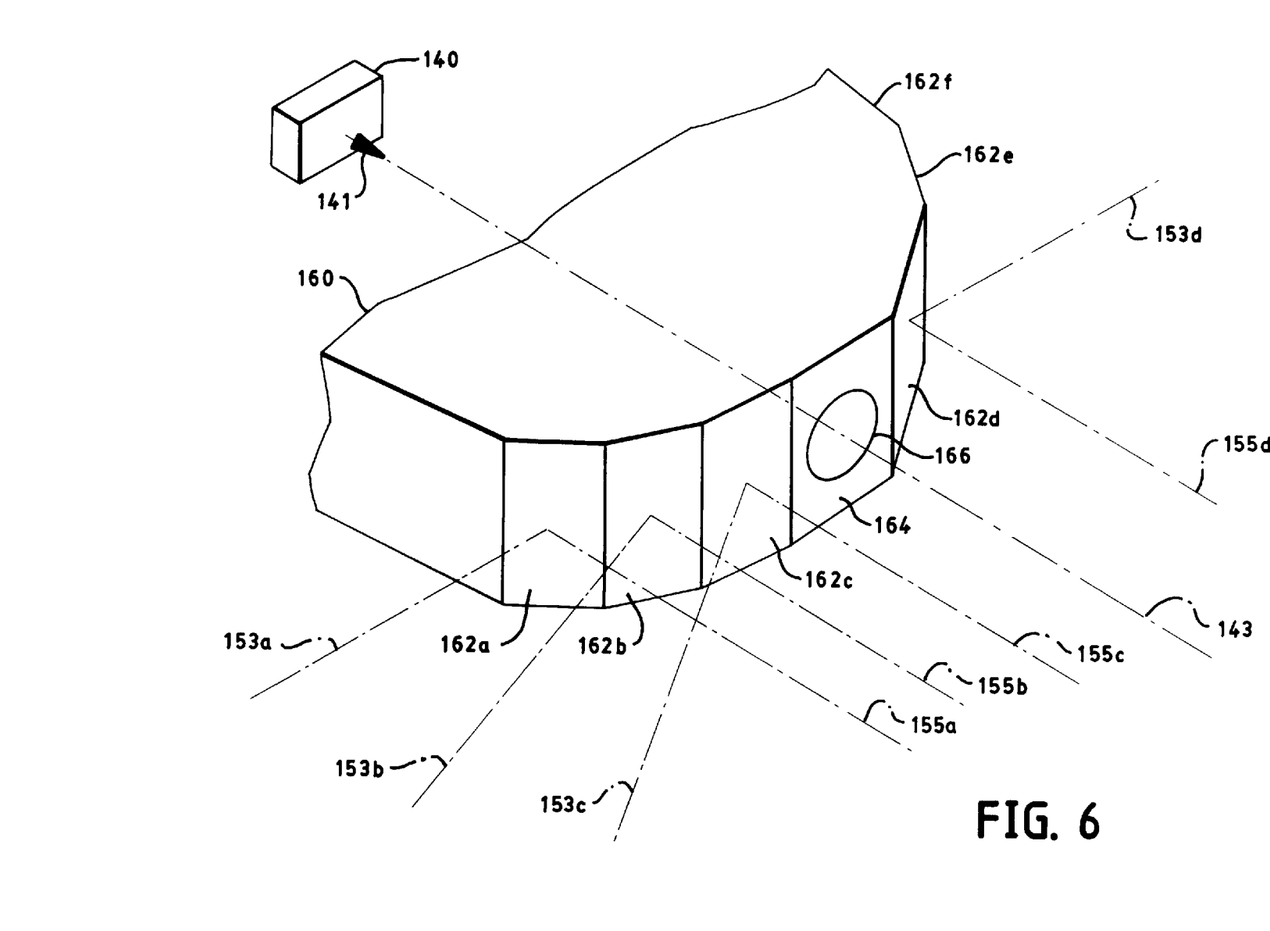
FIG. 6 is an alternative embodiment of the unitary beam deflector of FIG. 4 showing a through-hole to provide for direct coupling of an auxiliary source of radiation into a fiber laser or an optical fiber.

In yet another embodiment, output emissions 153a through 153d are coupled into a fiber laser or an optical fiber (not shown) by means of a unitary beam deflector 160, shown in FIG. 6. Unitary beam deflector 160 comprises deflecting facets 162a through 162f and a center facet 164 comprising a through-hole 166. Through-hole 166 provides a means for coupling an auxiliary source 140 emitting output radiation 141. Auxiliary source 140 may, for example, comprise a laser source, a modulating source, or a source of visible radiation used to assist in alignment of components. Output radiation 143 is directed into the fiber laser or optical fiber without redirection by deflection.

Deflecting facets 162a through 162d redirect incident emissions 153a through 153d along optical paths 155a through 155d, respectively, into the fiber laser or optical fiber. For reasons of clarity, the diagram does not show emissions incident upon deflecting facets 162e and 162f, but it should be understood that deflecting facets 162e and 162f provide the means by which two additional radiation sources can be coupled into the optical fiber or fiber laser. Moreover, it will be appreciated by one skilled in the relevant art that, although the axes normal to deflecting facets 162a through 162f are shown as coplanar, deflecting facets 162a through 162f may be disposed at different orientations as desired.

Figure 7:
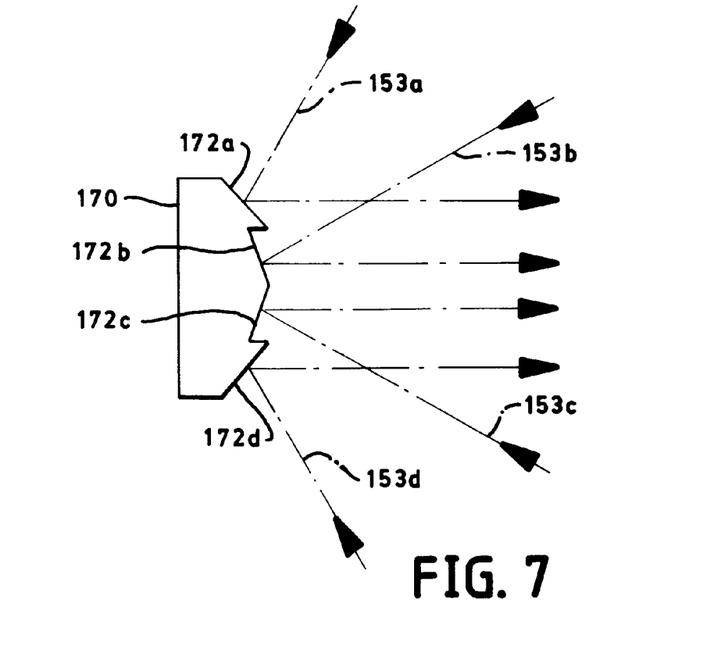
FIG. 7 is an alternative embodiment of the unitary beam deflector of FIG. 4 showing offset adjacent facets.
Figure 8:
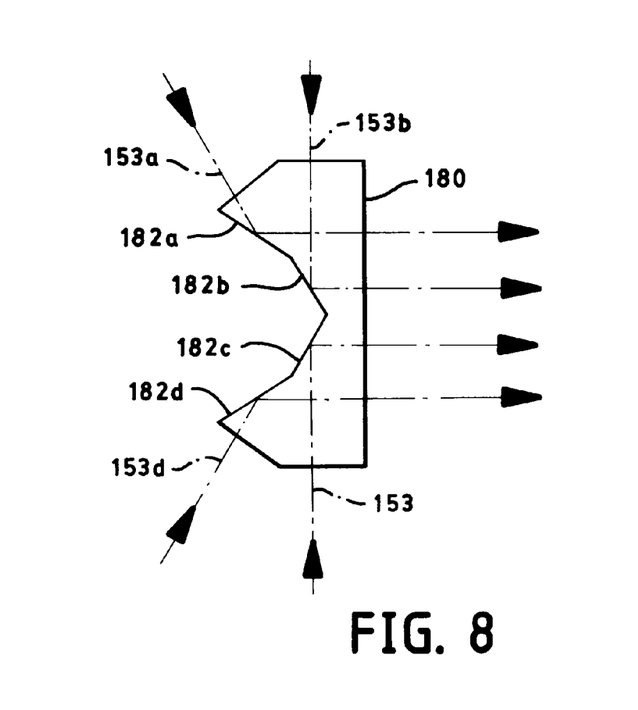
FIG. 8 is an alternative embodiment of the unitary beam deflector of FIG. 4 wherein deflection is provided by means of an optically-transparent beam deflector comprising internal reflective surfaces.

In yet another embodiment, shown in FIG. 7, redirection of incident radiation beams 153a through 153d is provided by a unitary beam deflector 170 comprising deflecting facets 172a through 172d. As can be seen, facet 172a is offset from and does not form a dihedral angle with adjacent facet 172b. In a further embodiment, deflection is achieved by means of total internal reflections occurring at deflecting facets 182a through 182d of an optically-transparent unitary beam deflector 180, shown in FIG. 8. As in the embodiments described above, deflecting facets 182a through 182d are sized and positioned so as to deflect incident beams 153a through 153d respectively into an optical waveguide (not shown).

Figure 9:
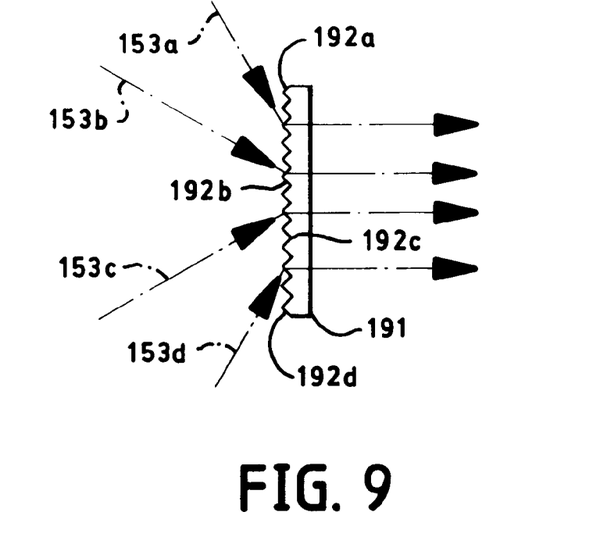
FIG. 9 is an alternative embodiment of the unitary beam deflector of FIG. 8 wherein deflection is provided by diffractive means.
Figure 10:
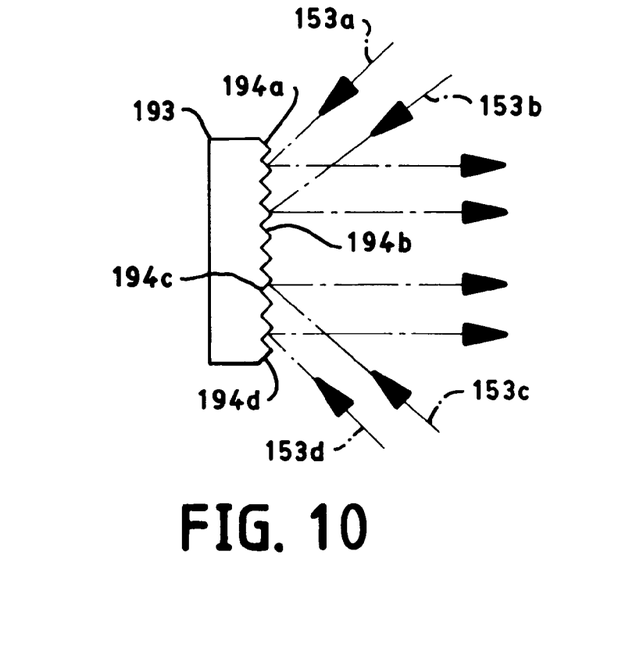
FIG. 10 is an alternative embodiment of the unitary beam deflector of FIG. 4 wherein deflection is provided by diffractive means.

Deflection can also be provided by a diffractive element. There is shown in FIG. 9 an optically-transparent unitary beam deflector 191 comprising deflecting facets 192a through 192d. Deflecting facet 192a is configured to deflect incident radiation beam 153a into an optical waveguide (not shown). Likewise, each of deflecting facets 192b, 192c, and 192d are configured to deflect incident radiation beams 153b, 153c, and 153d, respectively. Alternatively, a unitary beam deflector 193 need not be optically transparent, as shown in FIG. 9. Unitary beam deflector 193 comprises deflecting facets 194a through 194d, each of which is a diffractive element configured so as to appropriately deflect incident beams 153a through 153d respectively.

Figure 11:
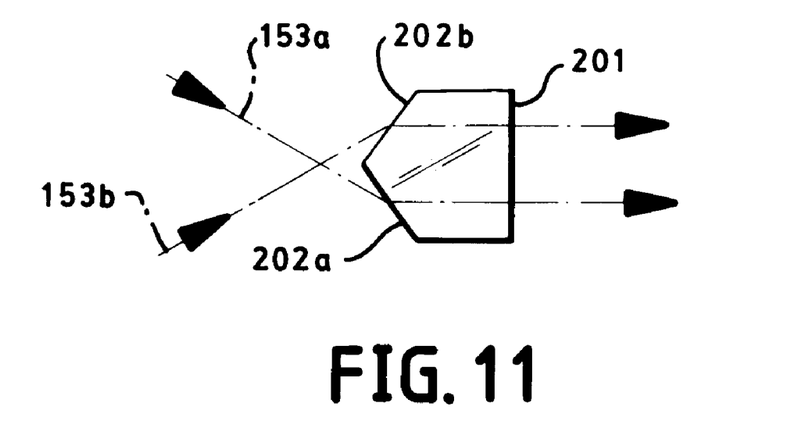
FIG. 11 is an alternative embodiment of the unitary beam deflector of FIG. 8 wherein deflection is provided by refractive means.
Figure 12:
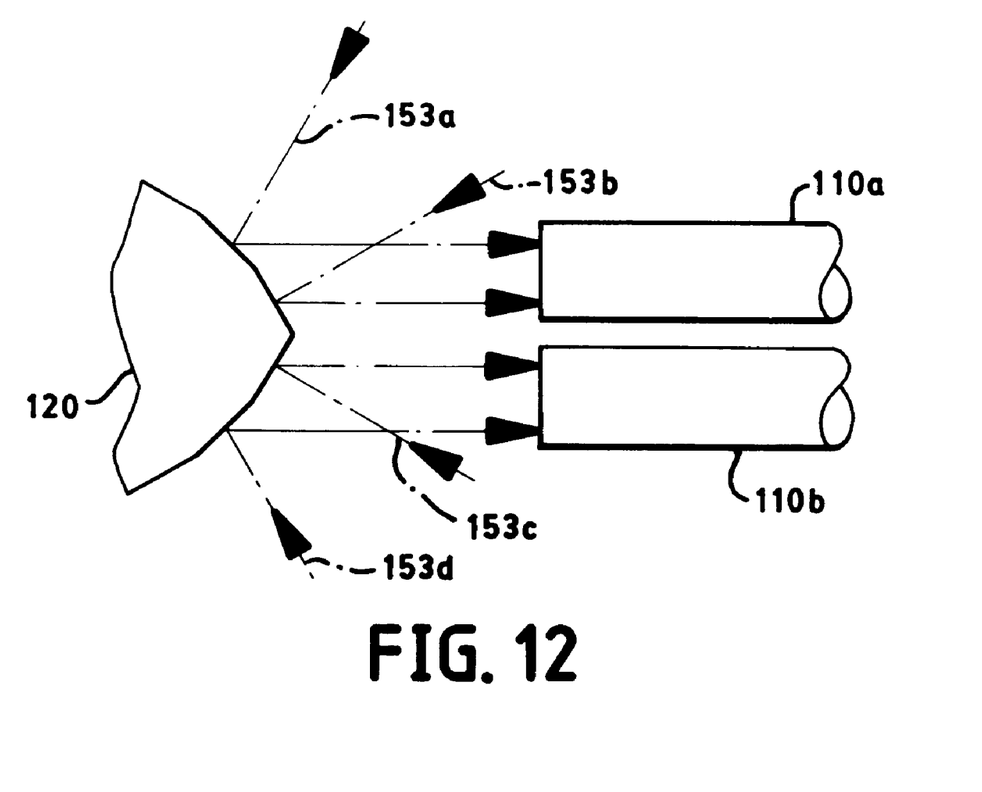
FIG. 12 is an alternative embodiment of the system of FIG. 1 wherein source radiation is deflected into more than one waveguide.

Moreover, deflection can also be provided by refractive means. There is shown in FIG. 11 an optically-transparent unitary beam deflector 201 comprising deflecting facets 202a and 202b. Deflecting facets 202a and 202b are sized and oriented so as to deflect incident beams 153a and 153b, respectively, into an optical waveguide (not shown) by refraction. As can be appreciated by one skilled in the relative art, refractive and diffractive surfaces can be utilized in place of one or more of the reflecting surfaces specified in the embodiments described above without detriment to the present invention. In yet another embodiment, shown in FIG. 12, incident beams 153a through 153d are deflected into two optical waveguides 110a and 110b by means of unitary beam deflector 120. Such a configuration is achieved by a suitable arrangement of radiation sources, beam deflector, and waveguides.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical apparatus suitable for coupling radiation beams into an optical waveguide, said apparatus comprising:
   a unitary beam deflector comprising at least two essentially planar deflecting facets, each said deflecting facet disposed in the optical path of a radiation beam and oriented so as to deflect the corresponding radiation beam into the optical waveguide;
   first input optical imaging means disposed in the optical path between a first said deflecting facet and a first one of the radiation beams, such that the first radiation beam is focused onto said first deflecting facet;

second input optical imaging means disposed in the optical path between a second said deflecting facet and a second one of the radiation beams, such that the second radiation beam is focused onto said second deflecting facet; and, output optical imaging means disposed in the optical path between said deflecting facets and the optical waveguide, such that said facet beam images are juxtaposed and imaged onto the optical waveguide.

2. The optical apparatus of claim 1 wherein said first input optical imaging means comprises an afocal relay system.

3. The optical apparatus of claim 2 wherein said afocal relay system comprises a first positive power lens having a focal length $f_1$ and a second positive power lens having a focal length $f_2$, said lenses having principal planes spaced apart by a distance $(f_1+f_2)$.

4. The optical apparatus of claim 1 wherein said output optical imaging means comprises an afocal relay system.

5. The optical apparatus of claim 4 wherein said afocal relay system comprises a first positive power lens having a focal length $f_3$ and a second positive power lens having a focal length $f_4$, said lenses having principal planes spaced apart by a distance $(f_3+f_4)$.

6. The optical apparatus of claim 1 wherein said unitary beam deflector comprises an optically-transparent material.

7. The optical apparatus of claim 6 wherein at least one of said deflecting facets is oriented so as to deflect the corresponding radiation beam by means of total internal reflection.

8. The optical apparatus of claim 6 wherein said deflecting facet comprises a diffraction surface.

9. The optical apparatus of claim 1 wherein said deflecting facet comprises a reflecting surface.

10. The optical apparatus of claim 9 wherein said reflecting surface comprises a dichroic reflector.

11. The optical apparatus of claim 1 wherein said deflecting facet comprises a diffraction surface.

12. The optical apparatus of claim 1 wherein said first deflecting facet forms a dihedral angle with said second deflecting facet.

13. The optical apparatus of claim 1 wherein said first deflecting facet is rectangular in shape.

14. The optical apparatus of claim 13 wherein the height of said deflecting facet is approximately equal to the projection of the lateral component of the corresponding radiation beam.

15. The optical apparatus of claim 13 wherein the width of said deflecting facet is approximately equal to the projection of the transverse component of the corresponding radiation beam.

16. The optical apparatus of claim 13 wherein said deflecting facet is approximately 3.0 mm by 0.3 mm in size.

17. The optical apparatus of claim 1 wherein said unitary beam deflector further comprises a through-hole disposed in the optical path of a radiation beam.

18. A system suitable for providing a high-level source of optical radiation, said system comprising:

a first discrete source of optical radiation for providing a radiation beam having wavelength $\lambda_1$;

a second discrete source of optical radiation for providing a radiation beam having wavelength $\lambda_2$;

an optical waveguide;

a unitary beam deflector comprising at least two essentially planar deflecting facets, each said deflecting facet disposed in the optical path of one of said radiation beams and oriented so as to deflect the corresponding radiation beam into the optical waveguide;

a first input afocal relay system disposed in the optical path between a first said deflecting facet and a first one of said radiation beams, such that said first radiation beam is focused onto said first deflecting facet;

a second input afocal relay system disposed in the optical path between a second said deflecting facet and a second one of said radiation beams, such that said second radiation beam is focused onto said second deflecting facet; and, an output afocal relay optical system disposed in the optical path between said deflecting facets and said optical waveguide, such that said facet beam images are juxtaposed and imaged onto said optical waveguide.

19. The system of claim 18 wherein said first discrete source of optical radiation comprises a radiation source selected from the group consisting of: laser diode, light-emitting diode, incandescent tungsten filament, and arc lamp.

20. The system of claim 18 wherein said waveguide comprises an optical fiber.

21. The system of claim 20 wherein said optical fiber comprises a cladding layer.

22. The system of claim 21 wherein said cladding layer has a cross-sectional shape in the form of a convex polygon.

23. The system of claim 18 wherein said unitary beam deflector comprises an optically-transparent material.

24. The system of claim 23 wherein at least one of said deflecting facets is oriented so as to deflect the corresponding radiation beam by means of total internal reflection.

25. The system of claim 18 wherein said deflecting facet comprises a diffraction surface.

26. The system of claim 18 wherein said deflecting facet comprises a reflecting surface.

27. The system of claim 26 wherein said reflecting surface comprises a dichroic reflector.

28. The system of claim 18 wherein said deflecting facet comprises a diffraction surface.

29. The system of claim 18 wherein said first deflecting facet forms a dihedral angle with said second deflecting facet.

30. The system of claim 18 wherein said deflecting facet is approximately 3.0 mm by 0.3 mm in size.

31. The system of claim 18 wherein said unitary beam deflector further comprises a through-hole disposed in the optical path of one of said radiation beams.

32. A fiber laser comprising:

a first discrete source of laser radiation for providing a laser beam having wavelength $\lambda_1$;

a second discrete source of laser radiation for providing a laser beam having wavelength $\lambda_2$;

an optical fiber comprising a first cladding layer;

a unitary beam deflector comprising at least two essentially planar deflecting facets, each said deflecting facet disposed in the optical path of one of said laser beams and oriented so as to deflect the corresponding said laser beam into said optical fiber;

a first input afocal relay system disposed in the optical path between a first said deflecting facet and a first one of said laser beams, such that said first laser beam is focused onto said first deflecting facet;

a second input afocal relay system disposed in the optical path between a second said deflecting facet and a second one of said laser beams, such that said second laser beam is focused onto said second deflecting facet; and, an output afocal relay optical system disposed in the optical path between said deflecting facets and said optical fiber, such that said facet beam images are juxtaposed and imaged onto an end of said optical fiber.

33. The fiber laser of claim 32 wherein said optical fiber comprises a second cladding layer.

34. The fiber laser of claim 32 wherein said first cladding layer has a cross-sectional shape in the form of a convex polygon.

35. The fiber laser of claim 32 wherein said first discrete source of laser radiation comprises a laser diode.

36. The fiber laser of claim 32 wherein said unitary beam deflector comprises an optically-transparent material.

37. The system of claim 36 wherein at least one of said deflecting facets is oriented so as to deflect the corresponding laser beam by means of total internal reflection.

38. The fiber laser of claim 32 wherein said deflecting facet comprises a diffraction surface.

39. The fiber laser of claim 32 wherein said deflecting facet comprises a reflecting surface.

40. The system of claim 39 wherein said reflecting surface comprises a dichroic reflector.

41. The fiber laser of claim 32 wherein said first deflecting facet forms a dihedral angle with said second deflecting facet.

42. The fiber laser of claim 32 wherein said unitary beam deflector further comprises a through-hole disposed in the optical path of one of said laser beams.

* * * * *